Patented June 18, 1935

2,005,382

UNITED STATES PATENT OFFICE 2,005,382

RUBBER FOR ELECTRICAL INSULATION AND WATER RESISTANT MATERIALS AND METHOD OF PRODUCING THE SAME

John McGavack, Leonia, and Ralph F. Tefft, Nutley, N. J., assignors, by mesne assignments, to United States Rubber Company, New York, N. Y., a corporation of New Jersey No Drawing. Application June 26, 1931, Serial No. 547,174

8 Claims. (Cl. 106—13)

This invention relates to an improved rubber for electrical insulation and water resistant materials and methods of producing the same.

Heretofore it has been impractical to use rubber to advantage for electrical insulation where the insulation might be exposed to water to any very great extent. For such special uses gutta percha and the like have been practically the only materials used. It has been proposed to produce a suitable rubber for this purpose by washing crude rubber under extreme conditions in order to free the rubber from the water soluble materials present therein. It has also been suggested to prepare rubber from a diluted latex which has undergone a prolonged heat treatment by coagulating the rubber from the thus treated latex and washing the coagulated mass. These processes involve a prolonged heat treatment or an extreme amount of washing during mastication which treatments affect deleteriously the strength of the rubber.

The present invention has as one of its objects the production of a rubber material having improved water resistant electrical insulation properties. Another object of the invention is to prepare a latex composition which may be used directly in the preparation of electrical insulation, the manufacture of electricians' gloves, or in any dipping process where improved electrical insulation properties of the product are desired or where the finished product must be very resistant to water. A further object of the invention is to prepare a crude rubber which can be used in the manufacture of electrical insulation and water resistant materials. Other objects and advantages of the present invention will appear from the following description.

With a preferred embodiment in mind, but without intention to limit the scope of our invention beyond what may be required by the prior art—the invention briefly consists in repeatedly creaming latex by the addition of suitable creaming agents or by other known means in order to obtain a dispersion from which a crude rubber of the desired properties may be recovered by acid coagulation, spray drying or other methods well known in the art, and from which articles and coatings may be directly formed, by well known dipping and drying or dipping and coagulation methods. This latex modified by creaming may be used as such, as above described, or it may be further treated to improve the rubber recovered or deposited from it by adding to it a dispersion of wax, as for example, Montan wax, beeswax, carnauba wax, or other natural waxes. Preferably a dispersion of wax in dilute ammonia alone is added directly to the latex. In introducing the wax into the latex in this manner, no other materials than are already present in an ammonia preserved latex are added with the wax. The ammonia partly saponifies the wax and this partly saponified wax acts as the stabilizer for the wax and water dispersion. Further, this method of introducing the wax into the latex as a dispersion in only dilute ammonia, will give a recovered rubber that contains no ingredients other than the wax itself by virtue of the addition of such wax. The addition of the wax to the latex repeatedly creamed as described above, gives a rubber compound far superior in electrical and water resisting properties to rubber recovered from repeatedly creamed latex without the addition of wax. We have also found that the addition of waxes in the manner described above to normal latex or to once creamed latex produces a decided increase in electrical and water resisting properties of rubber from such latex, even to the extent of producing a latex from which satisfactory materials for a great many electrical insulation purposes may be made.

To illustrate one embodiment of our invention, the creaming of the latex may be carried out substantially as follows: normal latex containing 100 pounds of dry solids is treated with .2 pounds of dry ammonium alginate dispersed in water the concentration adjusted to approximately 32% solids, and allowed to stand with or without heating for 24–48 hours. At the end of this time the latex will have been separated in two layers of approximately equal volume. The lower layer, which is substantially free from rubber but which contains non-rubber water soluble materials, is drawn off and discarded. To the separated upper layer known as the cream, .13–.15 pounds of ammonium alginate dispersed in water and 5 pounds of 28% ammonia are added with sufficient water to make the total solids concentration again approximately 32%. After standing 24 to 48 hours as before the separation is repeated. A third creaming is carried out in exactly the same manner as the second creaming. It may be noted that the ammonia added with the ammonium alginate is for the purpose of preventing putrefaction, and it is not necessary so far as the creaming process itself is concerned to add ammonia to ammonium alginate in the creaming operation. It has been found that three creamings are sufficient to produce a latex from which a crude rubber having the desired properties may be obtained by any of the well known methods of recovering rubber from latex, or from which electrical insulation, electricians' gloves, and other articles may be directly obtained by dipping and drying, dipping and coagulation, deposition, filtration, and other well known methods. While three creamings are sufficient for all practical purposes, a further number of creamings will produce latices with still less content of non-rubber water soluble materials, and hence with even better electrical and water resistant properties, which may be desirable in certain cases. We have disclosed ammonium alginate as the creaming agent, but any creaming agent well known in the art, such as karaya gum, gum tragacanth, pectins or Irish moss may be used. Also repeated creamings may be accomplished by centrifuging or by centrifuging together with the addition of creaming agents instead of by the addition of creaming agents alone, as is well known in the art. The latex, or rubber recovered from the creamed latex, may be compounded or not as desired for the specific purpose intended. The latex, or the rubber, may be vulcanized or may contain vulcanizing ingredients if desired.

Whether a crude rubber is to be recovered from the latex or whether the latex is to be used directly, or whether or not the latex is compounded, contains vulcanizing ingredients or is vulcanized, it is preferred to add to the latex, dispersions of natural waxes such as montan, beeswax and carnauba, etc., in order to still further improve the electrical and water resistant properties of the resultant rubber. It is also found that the addition of dispersions of these waxes to normal latex as well as to creamed latex very much improves the electrical and water resisting properties of the resultant rubber. Montan wax due to its low cost and ease of handling is the wax we prefer to use but other natural waxes such as beeswax and carnauba wax may be used. We prefer to add sufficient wax dispersion to give a resultant rubber compound containing about 4 to 8 parts of wax per 100 parts of rubber but more or less wax may be used if desired. The preferred dispersion of wax, for reasons stated above, is a dispersion of the wax in dilute aqueous ammonia, an example of the preparation of which is as follows: one part by weight of Montan wax is melted in 2 parts by weight of water and one quarter part by weight of 28% ammonia is added and the whole vigorously stirred. The Montan wax is thus dispersed in the liquid and the resultant dispersion may be added directly to the normal or creamed latex in amount sufficient to produce a resultant rubber containing preferably 4 to 8 parts of wax per 100 parts of rubber.

The improvement in properties of rubber produced by methods of this invention may be readily seen from the results of tests listed below. The following table shows the amount of water absorbed in milligrams per square centimeter of surface after 50 and 100 hours in distilled water of various acid coagulated rubbers:

| Acid coagulated samples | Water absorption | |
|---|---|---|
| | 50 hours | 100 hours |
| Pale crepe | 1.9 | 2.5 |
| Triple creamed latex | .5 | .6 |
| Normal ammonia latex with four parts Montan wax per 100 parts of rubber | .9 | 1.3 |
| Normal ammonia latex with four parts beeswax per 100 parts of rubber | .9 | 1.3 |

The following table shows the breakdown voltages, dry and after 25 days in water, of various rubber samples recovered from several of these improved latex compositions as compared with high grade pale crepe and smoked sheet rubbers of commerce:

| | Volts per mil | |
|---|---|---|
| | Dry | 25 days in water |
| Pale crepe | 700 | 200 |
| Smoked sheet | 700 | 250 |
| Pale crepe plus 8 parts Montan wax added on the mill | 700 | 300 |
| Acid coagulated rubber from once creamed latex | 720 | 360 |
| Acid coagulated rubber from once creamed latex plus 8 parts Montan wax added as dispersion to the latex | 740 | 650 |
| Acid coagulated rubber from triple creamed latex | 720 | 650 |

Regular factory insulation compounds for ignition wire were prepared from first grade Ceylon smoked sheet and from triple creamed spray dried rubber as follows:

| | Parts by weight |
|---|---|
| Rubber | 100 |
| Sulphur | 4.4 |
| Heptene base | 1.35 |
| Factice | 97 |
| Mineral rubber | 65 |
| Zinc oxide | 51 |

The insulation compounds prepared from smoked sheet and triple creamed spray dried rubber as above were applied to the conductor and cured by heat in a manner well known in the art. The insulation made from the compound with triple creamed, spray dried rubber showed approximately three times greater resistance to corona breakdown than the same compound with rubber from smoked sheet. Also there was a considerable increase in the voltage necessary to puncture the insulation. In another insulation compound it was found that there was approximately 25% increase in voltage breakdown, and 50% increase in insulation resistance with a compound from triple creamed, spray dried rubber over the value found in the same insulation compound from smoked sheet. To show the improvement in the use of multiple creamed latex over once creamed latex, in direct deposition of electrical cable insulations from latex compositions on a conductor, tests were run on wires which were insulated by dipping the wires into once and triple creamed latex compositions compounded as below and then removing the wire and drying the deposited film.

| | Parts by weight |
|---|---|
| Rubber | 100 |
| Sulphur | 2–4 |
| Zinc oxide | .05–5 |
| Heptene base | .5 |

The insulations were cured by heating for 20 minutes at forty pounds steam pressure. The heptene base along with the zinc oxide in the above formulas acts as an accelerator for the vulcanization. We found a breakdown voltage of 10,000 volts for a wire coated with the triple creamed latex compound as compared with 4,700 volts with the once creamed latex compound. After three days immersion in water, these wires showed a breakdown of 3,000 and 2,200 volts respectively. On wires which were insulated with the same once and triple creamed latex compositions and then coagulated by dipping in acid instead of by drying, the triple creamed compound showed 8,600 volts dry as compared with 6,400 volts for the once creamed compound. After 24 hours in water values were 5,500 and 3,800 volts respectively. With the dipped and acid coagulated samples, in the tests after immersion in water, the triple creamed compound showed no appreciable current leakage, while the once creamed compound showed so high a current leakage that it was exceedingly difficult to measure the breakdown voltage. With the dipped and dried samples, where no electrolyte had been added, there was no appreciable current leakage in either the triple creamed or once creamed compound after immersion. Several conductor wires were dipped in repeatedly centrifuged latices without the addition of any compounding or curing materials, and a considerable improvement was shown on repeated centrifuging. The wires dipped in once centrifuged latices showed a breakdown voltage of 1,650 volts and wires dipped in triple centrifuged latex a breakdown voltage of 2,500 volts.

In order to show the improvement in water absorption and electrical properties of articles made on forms dipped in latex and coagulated by a subsequent dipping in acid, in a manner well known in the art, the following results of tests are included. A number of glazed forms were alternately dipped in various latex compounds and acetic acid, thereby building up a uniform deposit of rubber about .06 inch thick on the form. These were dried and cured. An article made from triple creamed latex with eight parts Montan wax per 100 parts rubber withstood 10,000 volts even after 360 hours in water. There was no appreciable increase in current leakage at 10,000 volts within 170 hours. The same compound without the addition of Montan wax showed a considerable increase in leakage at 10,000 volts after 116 hours and the same compound with once creamed latex and also containing eight parts Montan wax per 100 parts of water showed a very great leakage after 48 hours and broke at 8,000 volts. These results are illustrated in the following table which gives the current leakage of the test pieces under 10,000 volts, 60 cycles alternating current.

*Current leakage of dipped and acid coagulated articles*

| Hours in water | (Milliamperes at 10,000 v.) | | |
|---|---|---|---|
| | Triple creamed + wax | Triple creamed | Once creamed + wax |
| 0 | 1.7 | 2.1 | 2.1 |
| 45 | 1.8 | 2.2 | Broke at 8000 v. |
| 78 | 1.8 | | |
| 101 | 1.9 | | |
| 116 | | 3.1 | |
| 168 | | 3.5 Broke | |
| 195 | 2.4 | | |
| 360 | 8.9 | | |

This indicates quite definitely that triple creamed latex is far superior to the once creamed latex compound and also that the addition of Montan wax to the triple creamed compound gives a considerable improvement. This is of advantage especially in the manufacture of electricians' gloves and the like which may be made by dipping forms in latex and subsequently coagulating the rubber deposited on the form by drying or acid treatment in a manner well known in the art.

The process of this invention produces a rubber which may be recovered from the latex composition in any well known manner and which is very resistant to water and has excellent electrical insulation properties. A rubber latex has been produced which may be used directly in the preparation of electrical insulation, the product not being greatly affected by water. The dielectric strength and the ohmic resistance of articles made from the rubber of this invention, whether made from a crude rubber recovered from the latex, or made directly from the latex composition are high, thus making excellent insulating materials. The rubber may be used wherever a high dielectric strength is necessary as for the insulation of wires, electrical condensers or electrical insulation of any sort. Our latex is especially adapted to be used directly for insulating wire. It may be used in the manufacture of electricians' gloves or in any dipping processes where electrical insulation is desired or where the finished product must resist water, and in such dipping processes the rubber from the latex may be coagulated by drying, by an acid coagulation treatment, or by other coagulation methods known in the art.

While specific embodiments of the invention have been described, it is obvious that numerous modifications may be made therein and it is not desired to limit the invention otherwise than as set forth in the appended claims.

Having thus described our invention, what we claim and desire to protect by Letters Patent is:

1. As a composition of matter, creamed latex containing wax dispersed therein and an ammonium soap of the wax, said latex being substantially devoid of non-volatile water-soluble substances.

2. As a composition of matter, creamed latex containing an ammonium soap of a wax, and being substantially devoid of non-volatile water-soluble substances.

3. As a composition of matter, latex containing wax, dispersed therein and a saponification product of said wax, said latex being substantially free from added non-volatile water-soluble substances.

4. An article comprising grainless rubber containing wax intimately dispersed therein, said rubber being substantially devoid of water-soluble substances.

5. An article comprising rubber deposited directly from creamed latex containing wax dispersed therein and a saponification product of said wax, and said latex being substantially devoid of non-volatile water soluble substances.

6. An article comprising rubber derived directly from latex containing a dispersion of wax and a saponification product of said wax, said rubber being substantially devoid of water-soluble substances.

7. An article comprising rubber deposited directly from creamed latex containing dispersed therein four to eight parts Montan wax per 100 parts rubber, and said latex being substantially devoid of non-volatile water-soluble substances.

8. A method of preparing compounded rubber suitable as an insulator, which comprises creaming latex a plurality of times, adding to the creamed latex an ammoniacal dispersion of wax and a saponification product of said wax, and recovering a non-hygroscopic purified rubber-wax compound.

JOHN McGAVACK.
RALPH F. TEFFT.